(12) United States Patent
Lenoire et al.

(10) Patent No.: US 6,724,542 B2
(45) Date of Patent: Apr. 20, 2004

(54) MONOLITHIC OPTICAL DEVICE FOR LIGHT TRANSMISSION, AND MULTI-CHANNEL OPTICAL SYSTEM USING SAME

(75) Inventors: Didier Lenoire, Lumbin (FR); Dominique Godfroy, Grenoble (FR); Marek Gierczak, Meylan (FR)

(73) Assignee: Honeywell, Saint Aubin (FR)

( * ) Notice: Subject to any disclaimer, the term of this patent is extended or adjusted under 35 U.S.C. 154(b) by 0 days.

(21) Appl. No.: 10/148,910

(22) PCT Filed: Jan. 4, 2001

(86) PCT No.: PCT/FR01/00039
§ 371 (c)(1),
(2), (4) Date: Jun. 5, 2002

(87) PCT Pub. No.: WO01/50181
PCT Pub. Date: Jul. 12, 2001

(65) Prior Publication Data
US 2002/0181118 A1 Dec. 5, 2002

(30) Foreign Application Priority Data
Jan. 7, 2000 (FR) ............................................ 00 00201

(51) Int. Cl.⁷ ................................................ G02B 27/00
(52) U.S. Cl. ........................ 359/709; 359/613; 385/146
(58) Field of Search ................................. 359/709, 796, 359/797, 601, 613; 385/146

(56) References Cited

U.S. PATENT DOCUMENTS

| | | | |
|---|---|---|---|
| 4,013,812 A | * 3/1977 | Geiger | 442/23 |
| 4,575,196 A | * 3/1986 | Clegg | 359/709 |
| 4,627,692 A | 12/1986 | Clegg | 359/704 |
| 4,703,405 A | * 10/1987 | Lewin | 362/333 |
| 5,225,931 A | 7/1993 | Stavroudis | 354/601 |
| 5,980,063 A | * 11/1999 | Ford et al. | 362/186 |
| 6,337,946 B1 | * 1/2002 | McGaffigan | 385/146 |
| 6,464,936 B1 | * 10/2002 | Mowat et al. | 422/22 |

FOREIGN PATENT DOCUMENTS

| | | |
|---|---|---|
| EP | 0 534 853 A1 | 3/1993 |
| WO | WO 98/05463 | 6/1989 |
| WO | WO 98/53348 | 11/1998 |

* cited by examiner

Primary Examiner—Scott J. Sugarman
Assistant Examiner—Deborah Raizen
(74) Attorney, Agent, or Firm—Oliff & Berridge, PLC (57) ABSTRACT

An integrated light-transmission optical module for a safetyoptoelectronic barrier, comprises a condenser element having a first lens, and an objective having a second lens which are located respectively at a first end and a second end. The module comprises a single-piece entity made of transparent material, and having an intermediate zone provided with deflectors formed by a succession of dioptric surfaces distributed along the direction of light flux propagation between the first lens and the second lens. The deflectors ensure a deflection outside the optical module of stray rays reflected inside the module, so as to prevent transmission of strays rays, either through the second lens of the objective if it is a light transmission coming from the condenser element, or through the first lens when receiving light coming from the second lens.

13 Claims, 9 Drawing Sheets

MONOLITHIC OPTICAL DEVICE FOR LIGHT TRANSMISSION, AND MULTI-CHANNEL OPTICAL SYSTEM USING SAME

BACKGROUND OF THE INVENTION

The invention relates to a light-transmitting optical device comprising a condenser element equipped with a first lens to concentrate the light in the opening of a second lens of an objective designed to emit or receive an optical beam.

STATE OF THE ART

Light-transmitting optical devices generally use a system of lenses and diaphragms arranged in an optical chamber. It is imperative to provide a mechanical support designed to position the different parts with respect to one another with precision. Opto-electronic barriers generally have two hundred monitoring light beams requiring a total of four hundred light-transmitting optical devices on the transmitter side and receiver side. The large number of mechanical supports increases the cost price of the installation.

OBJECT OF THE INVENTION

A first object of the invention is to achieve a light-transmitting optical device in one single part able to eliminate any stray light rays not in the transmitting or receiving primary light beam passing through the objective. What is meant by primary light beam is all the light rays passing directly from one lens to the other. Any light ray taking a non-direct path is defined as being a stray ray.

The device according to the invention is characterized in that:

the first lens of the condenser element and the second lens of the objective are respectively arranged at one first end and at a second opposite end of an integrated optical module made of a transparent material having a predetermined refractive index, the intermediate zone of said integrated optical module comprises a plurality of deflectors formed by a succession of dioptric surfaces arranged at intervals along the direction of propagation of the light flux between the first lens and the second lens so as to perform deflection outside the optical module of the stray rays reflected inside the optical module, thereby preventing transmission of said stray rays either through the second lens of the objective if a light transmission coming from the condenser element is involved, or through the first lens if receiving light coming from the second lens.

The single-piece structure of the optical light transmission device avoids the use of an optical chamber equipped with mechanical support and positioning parts. This results in a reduction of the overall cost of the optical light transmission device.

According to a preferred embodiment, a diaphragm can be associated to the first end of the integrated optical module and comprise a calibrated orifice to determine the angular opening of the useful optical beam emitted or received by the objective.

In the absence of a diaphragm, it is the size of the first lens that determines the angular opening of the optical beam emitted or received by the objective.

The second lens of the objective presents a preset focal distance whose focus is advantageously identical to the plane of the diaphragm.

In the absence of a diaphragm, the second lens constituting the objective presents a preset focal distance whose focus is identical to the opening plane of the first lens constituting the condenser.

The shape and positioning of the dioptric surfaces of the deflectors are chosen to ensure lateral ejection by refraction of the stray rays reflected in the integrated optical module.

According to one feature of the invention, the material of the integrated optical module has a quality of transparency in the 360 nm to 1560 nm pass-band.

According to another feature of the invention, the dioptric surfaces are alternately convergent and divergent being joined to one another by coaxial necks presenting increasing diameters in the direction of the objective so as to define with the diaphragm a primary optical cone inside the module.

A second object of the invention is to achieve a multi-channel optical system using a plurality of integrated optical modules, preventing any light interference between the different channels.

An opto-electronic means is placed in each channel in front of the first lens of the corresponding condenser element and is formed either by a light-emitting diode in transmitter mode or by a photodiode in receiver mode. The different optical modules are integrated in parallel manner at regular intervals in a support plate equipped with salient fixing parts for clipping onto an electronic circuit housed inside a hollow elongate sectional part. The different modules of an optical system are joined to one another, opposite from the plate, by rigid connecting bridges whose front faces are cut into prisms and comprising in addition flexible tabs to act as pressure means when mechanical securing is performed inside the sectional part. The second lens of each objective of the optical modules is housed in an opening of the sectional part so as to be able to emit or receive the light beam.

Such a multichannel optical system can be used for constructing opto-electronic barriers equipped for protection of workers operating on dangerous machines.

BRIEF DESCRIPTION OF THE DRAWINGS

Other advantages and features will become more clearly apparent from the following description of an embodiment of the invention given as a non-restrictive example and illustrated in the accompanying drawings, in which.

DESCRIPTION OF A PREFERRED EMBODIMENT

Figure 1:
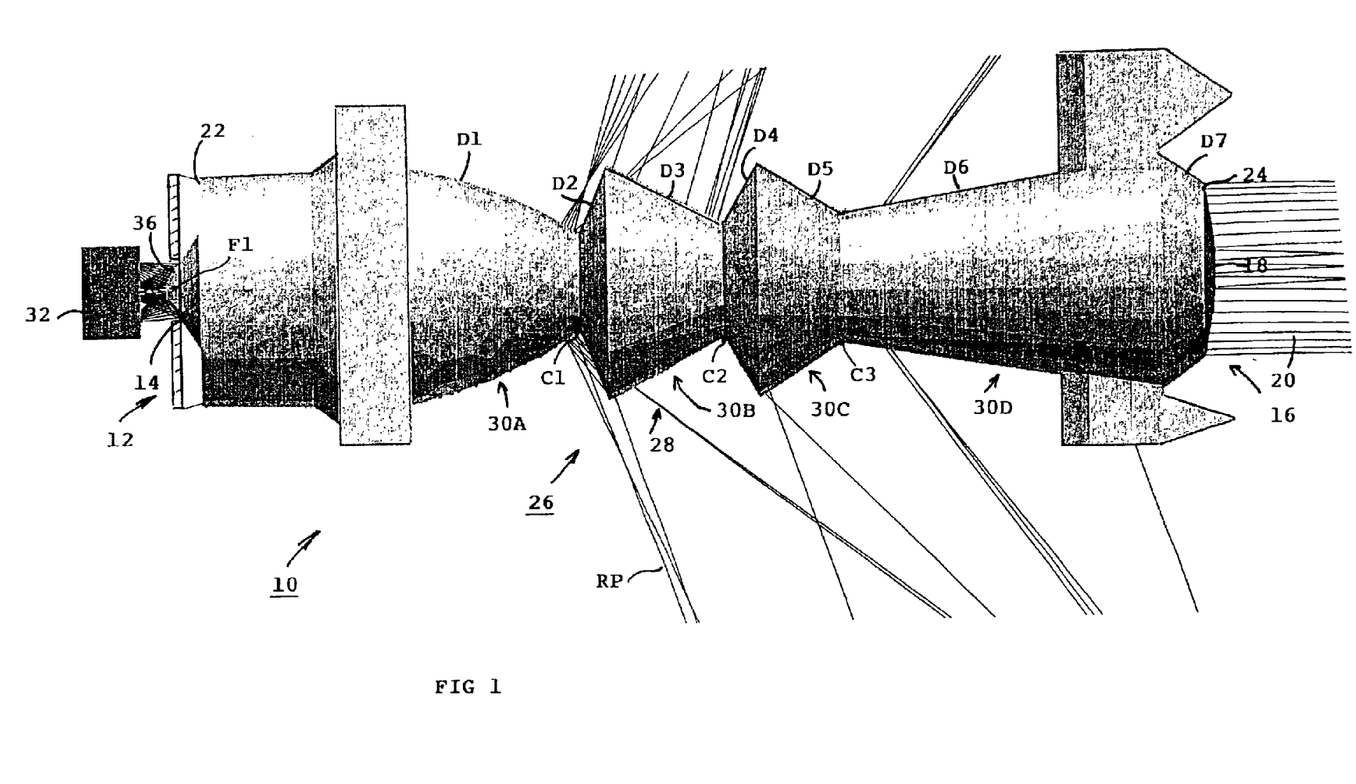
FIG. 1 is a perspective view of a light-emitting optical device according to the invention.
Figure 2:
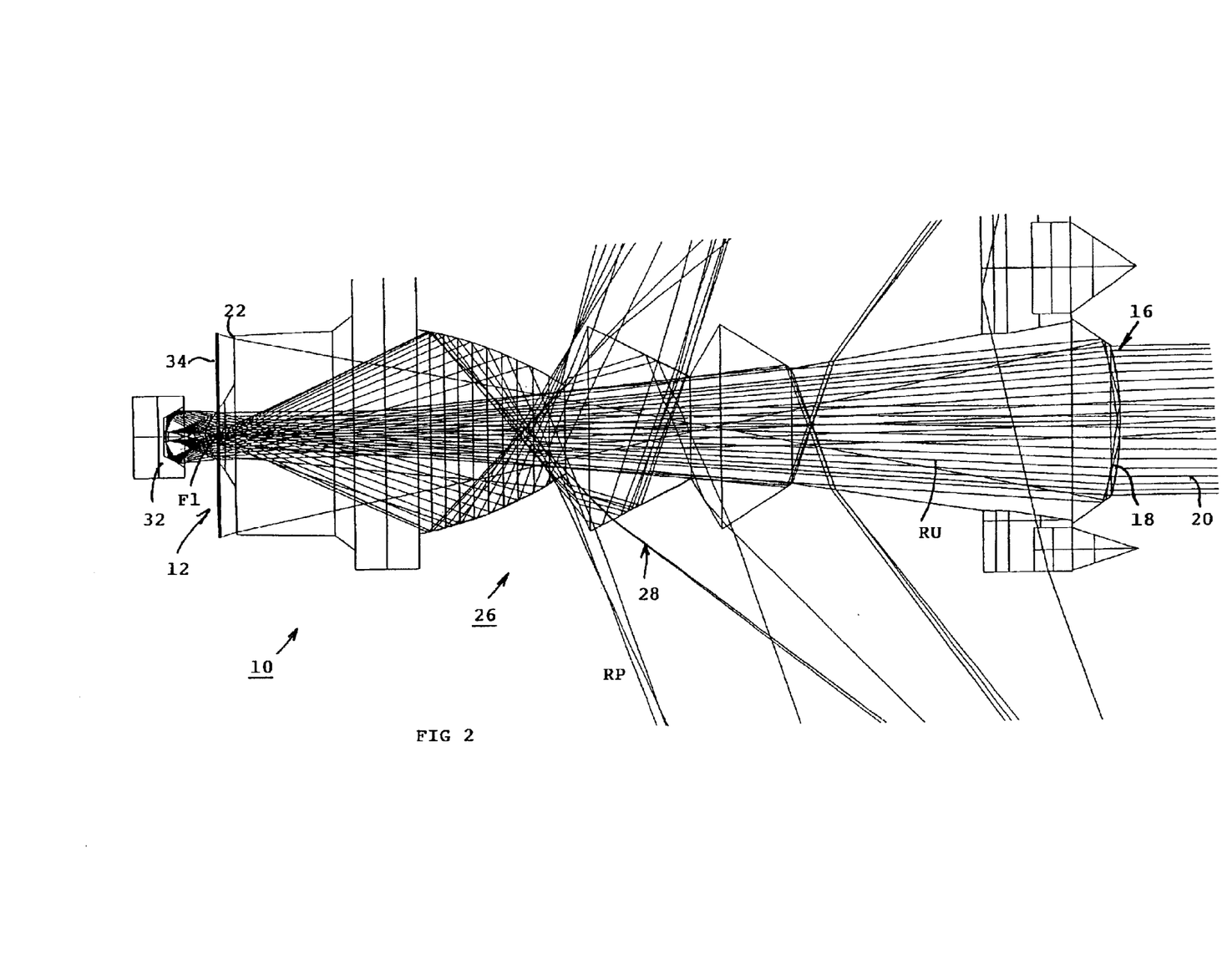
FIG. 2 illustrates the path of the rays in the light-emitting optical device according to FIG. 1.
Figure 3:
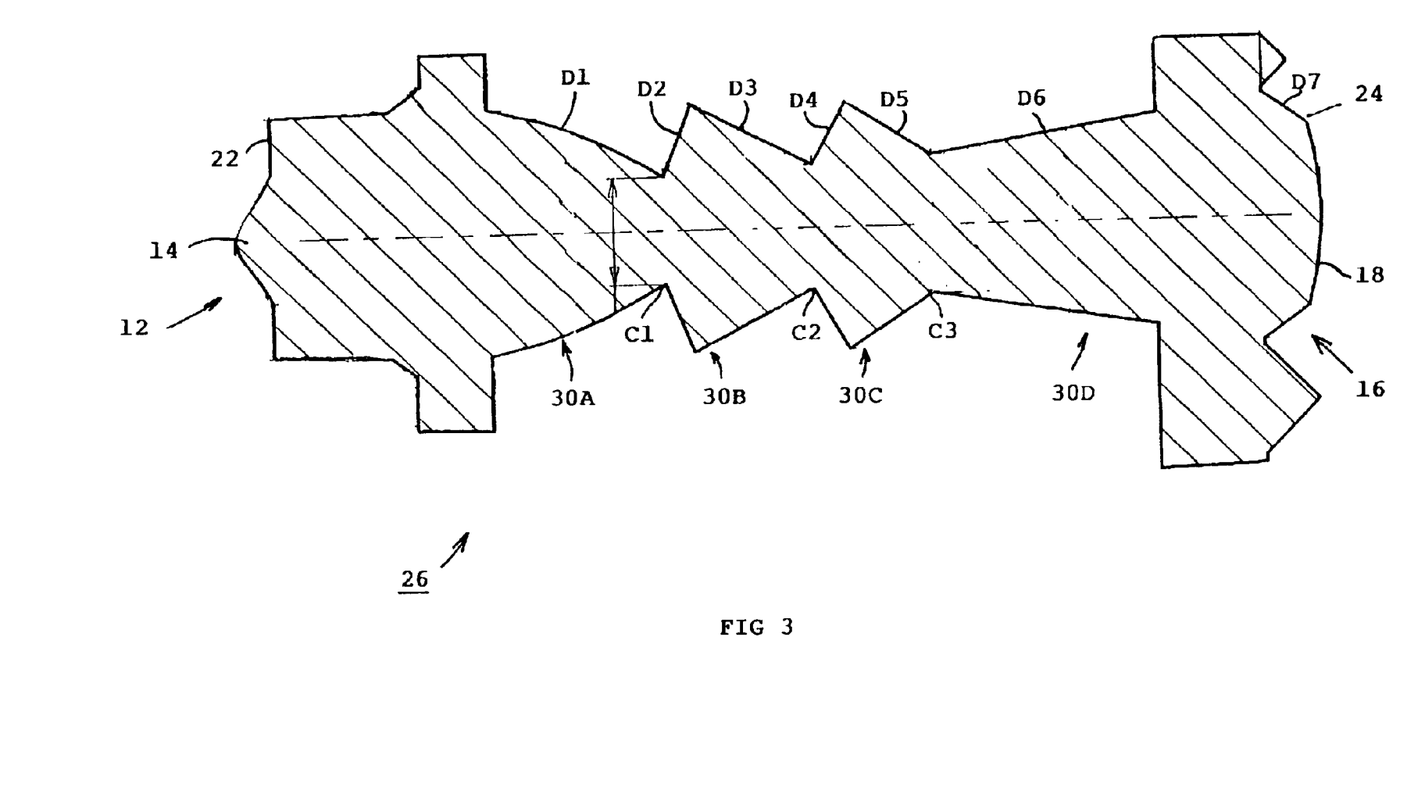
FIG. 3 represents an axial sectional view of the optical device of FIG. 1.
Figure 4:
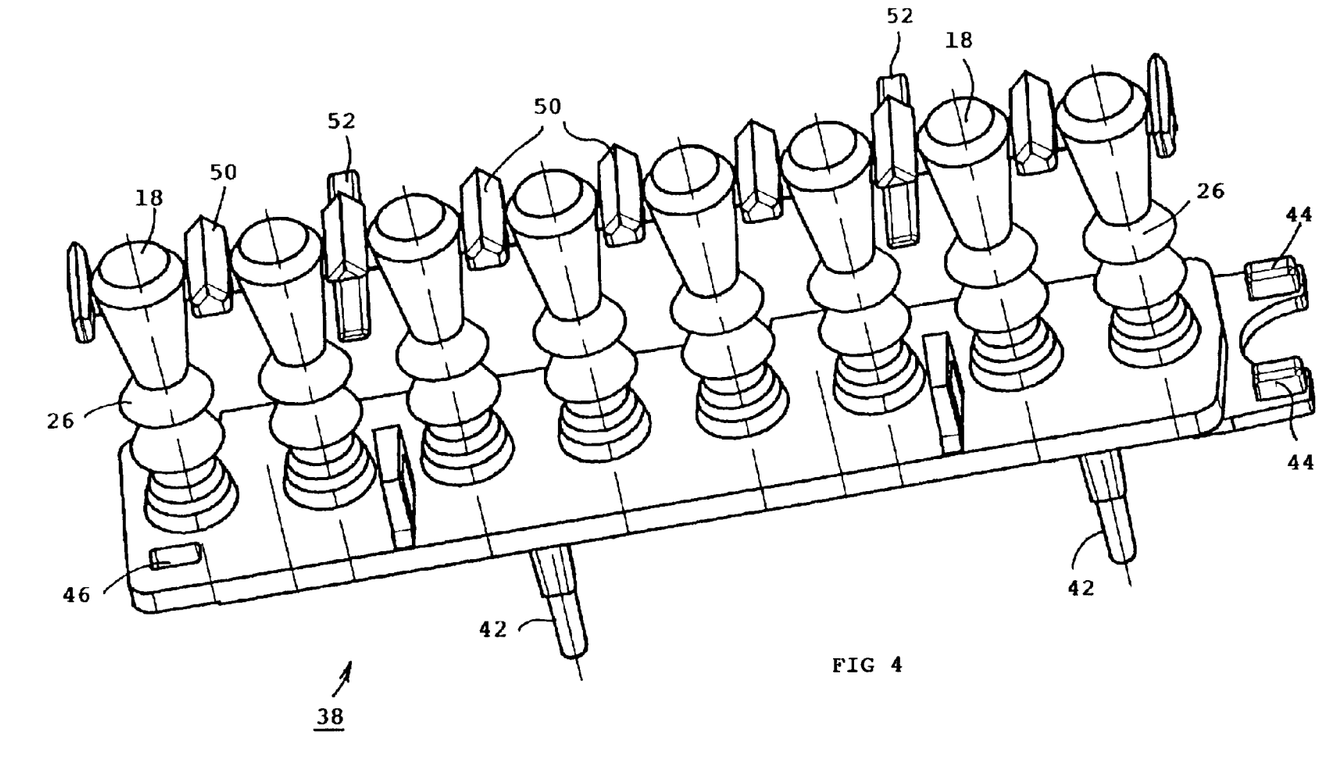
FIG. 4 is a perspective view of a multichannel optical system composed of several optical modules according to the invention.
Figure 5:
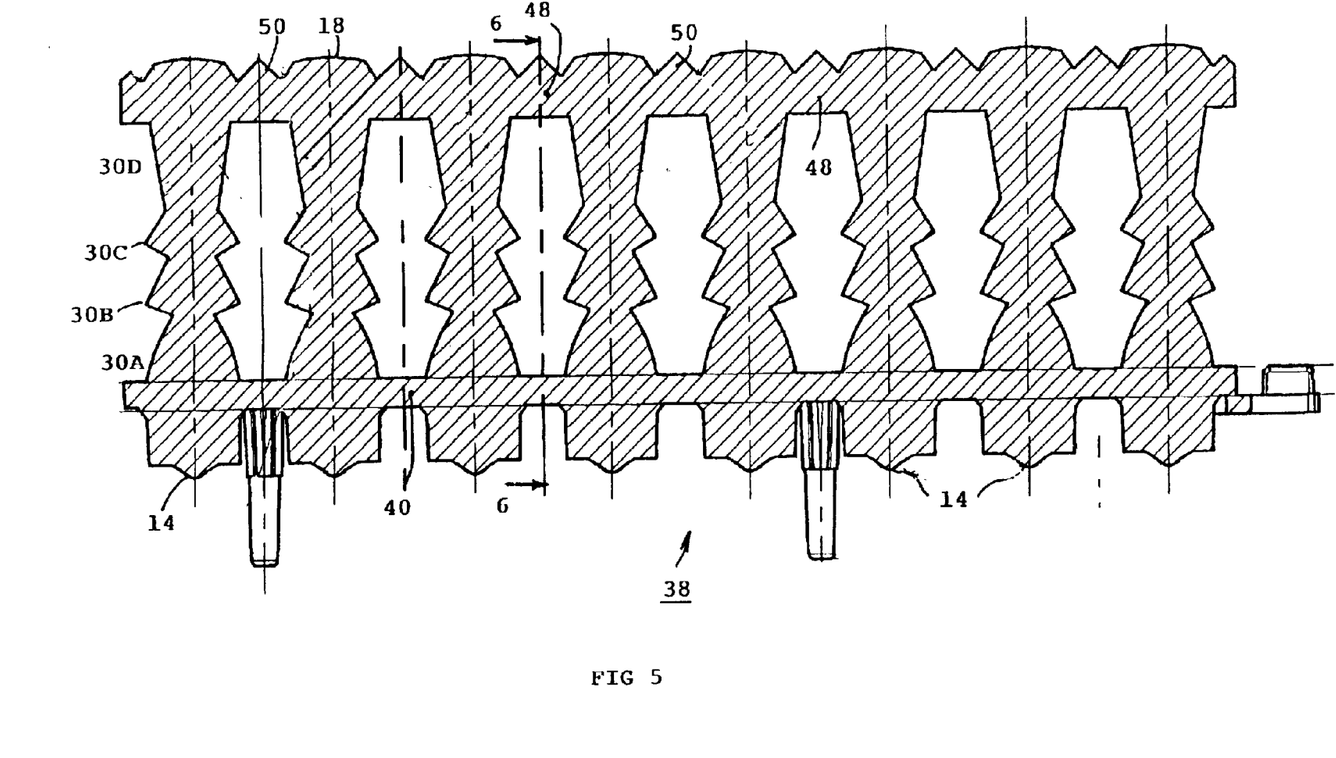
FIG. 5 represents an axial sectional view of the optical system of FIG. 4.
Figure 6:
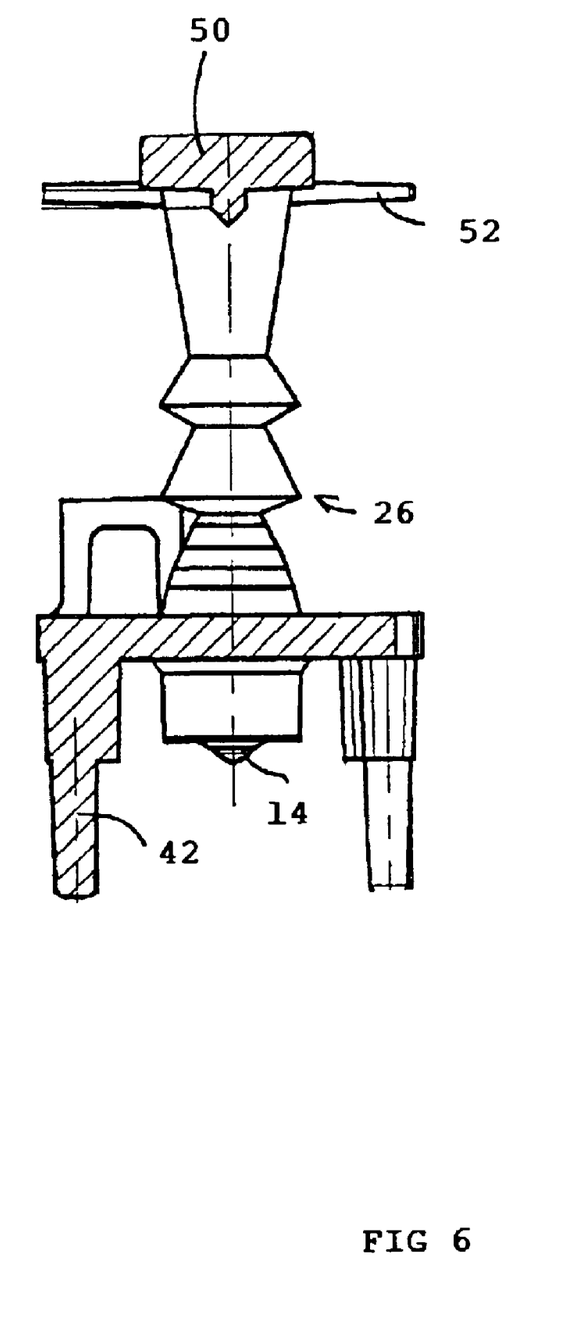
FIG. 6 is a cross-section along the line 6—6 of FIG. 5.
Figure 7:
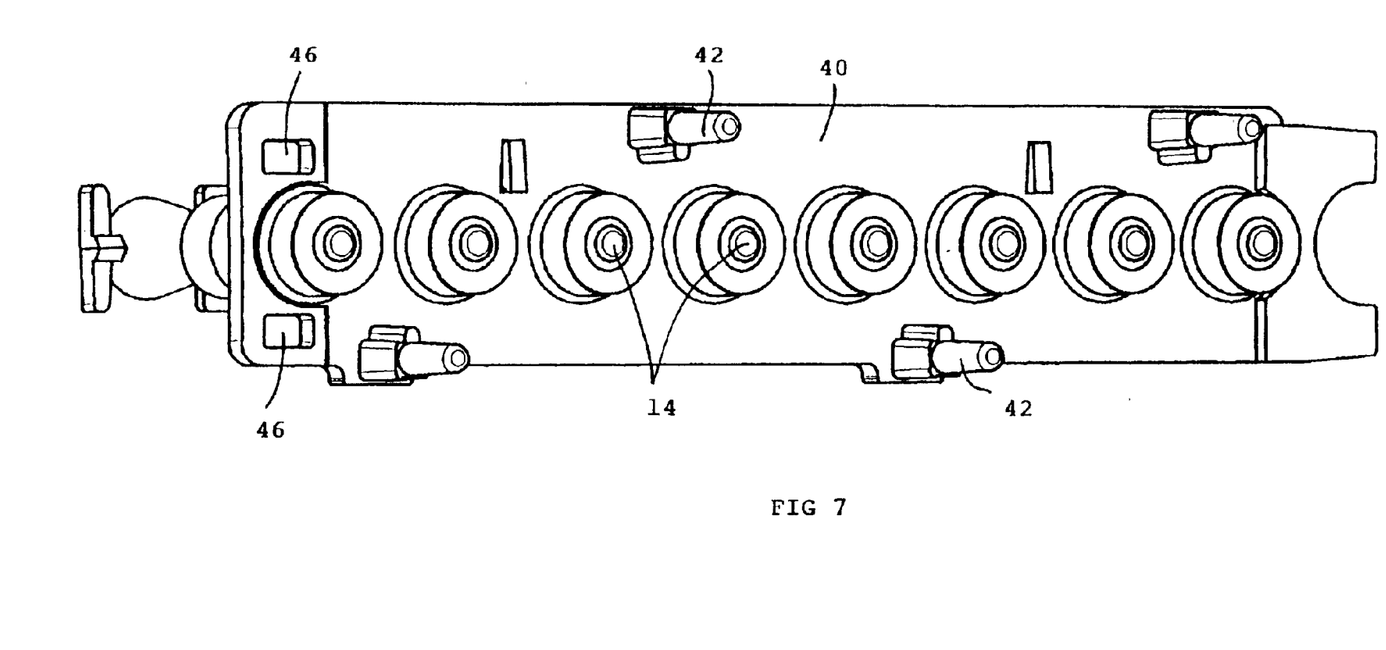
FIG. 7 shows a bottom view of the optical system of FIG. 4.

With reference to FIGS. 1 to 3, a light-transmitting optical device 10 comprises a condenser element 12 formed by a first lens 14 to concentrate the light in the opening of an objective 16 equipped with a second lens 18 designed to emit or receive an optical beam 20.

The first lens 14 of the condenser element 12 and the second lens 18 of the objective 16 are arranged respectively at one first end 22 and at a second opposite end 24 of an integrated optical module 26 achieved by a straight single-piece entity made of transparent material having a predetermined refractive index and a quality of transparency in the 360 nm to 1560 nm pass-band, i.e. in the visible and infrared field.

The intermediate zone 28 of the integrated optical module 26 comprises a plurality of deflectors 30A, 30B, 30C, 30D formed by a succession of dioptric surfaces D1 to D7 symmetrically arranged at intervals along the longitudinal direction of internal propagation of the light flux between the first lens 14 and the second lens 18. The role of the dioptric surfaces D1 to D7 consists in performing deflection of the stray rays reflected inside the optical module 26, thereby preventing transmission of these stray rays either through the second lens 18 of the objective 16 when transmission of light coming from the condenser element 12 is involved, or through the first lens 14 when receiving light coming from the second lens 18.

An opto-electronic means 32 is placed in front of the first lens 14 of the condenser element 12 with an interposed diaphragm 34 provided with a circular orifice 36 calibrated according to the angular opening of the second lens 18 that determines the diametric dimension of the useful optical beam 20 emitted or received by the objective 16. The opto-electronic means 32 can be a light transmitting means or a light receiving means.

The second lens 18 of the objective 16 presents a predetermined focal distance whose focus F1 is advantageously identical to the plane of the diaphragm 34.

In the case of a transmitter device, the opto-electronic means 32 is formed by a light-emitting diode LED or any other light source co-operating with the condenser element 12 to concentrate the useful light rays RU into a primary conical beam directed onto the surface of the second lens 18 after it has passed longitudinally through the transparent material of the module 26. The shape, number and positioning of the dioptric surfaces D1 to D7 of the deflectors 30A, 30B, 30C, 30D are chosen to ensure lateral ejection by refraction of the stray rays RP reflected in the integrated optical module 26. Ejection by refraction of the stray rays RP can take place after at least one internal reflection on one of the dioptric surfaces D1 to D7 depending on the value of the angle of incidence.

The dioptric surface D1 of the first deflector 30A presents a curved shape, notably a logarithmic spiral shape, enabling total reflection of most of the stray rays outside the optical cone of the useful rays RU. All the other dioptric deflection surfaces are in the shape of tapered cones, either divergent for the surfaces D2, D4, D6 or convergent for the surfaces D3, D5, D7 in the direction of propagation of the primary beam towards the objective 16 when in transmitter mode.

The dioptric surface D1 is joined to the dioptric surface D2 of the second deflector 30B by a first neck C1 having a diameter of about 3.5° mm. The dioptric surface D3 is joined to the dioptric surface D4 of the third deflector 30C by a second neck C2 having a diameter of about 4° mm. The dioptric surface D5 is joined to the dioptric surface D6 of the fourth deflector 30D by a third neck C3 having a diameter of 4.5° mm. The last dioptric surface D7 bounds at the end 24 the periphery of the second lens 18 of the objective 16 whose diameter is 6° mm.

The increasing variation of the diameters of the three coaxial necks C1, C2, C3 of the deflectors 30A to 30D in the direction of the objective 16 enables the primary optical cone of the useful rays RU inside the integrated optical module 26 to be defined with the diaphragm 34. All the other stray rays outside the optical cone are reflected on one or more dioptric surfaces and ejected laterally to the outside after refraction (see rays RP).

In the case of a receiver device, the opto-electronic means 32 are formed by a photodiode.

FIGS. 4 to 7 represent a multichannel optical system 38 composed of several optical modules 26 fitted in parallel at regular intervals on a support plate 40 of rectangular shape. The support plate 40 is equipped with fixing parts 42 extending perpendicularly to the flat surface of the plate 40 and salient from the first lens 14 of the condenser element 12. Clipping and positioning pins 44 are arranged at one of the ends of the plate 40, whereas the other end comprises holes 46 of conjugate shape to those of the pins 44. The presence of the pins 44 and holes 46 enables modular assembly of several optical systems 38 depending on the number of channels required.

Opposite the plate 40, the different modules 26 of an optical system 38 are joined to one another by rigid connecting bridges 48 whose front faces are cut into prisms 50. Flexible tabs 52 also form an integral part of the connecting bridges 48 to act as pressure means when mechanical securing is performed in a piece of equipment.

The different modules 26 of an optical system 38 are achieved by plastic injection or by any other forming process, in particular by pressure. The material used is a thermoplastic, in particular a transparent polyacrylic such as methyl polymethacrylate PMMA. It is clear that other transparent materials, in particular polycarbonate, glass, crystal, etc. can be used.

Figure 8:
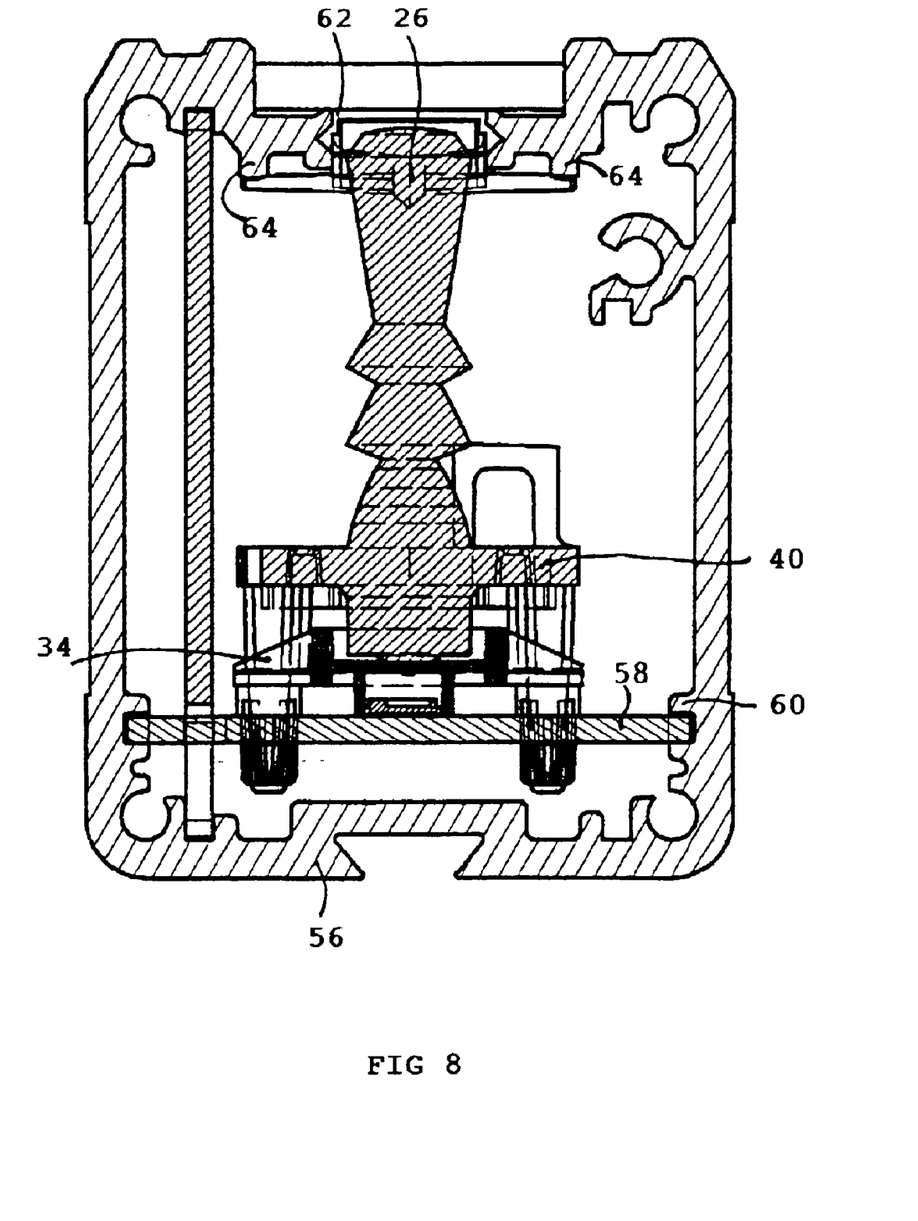
FIG. 8 represents the optical system integrated in an aluminium section to constitute an opto-electronic barrier.
Figure 9:
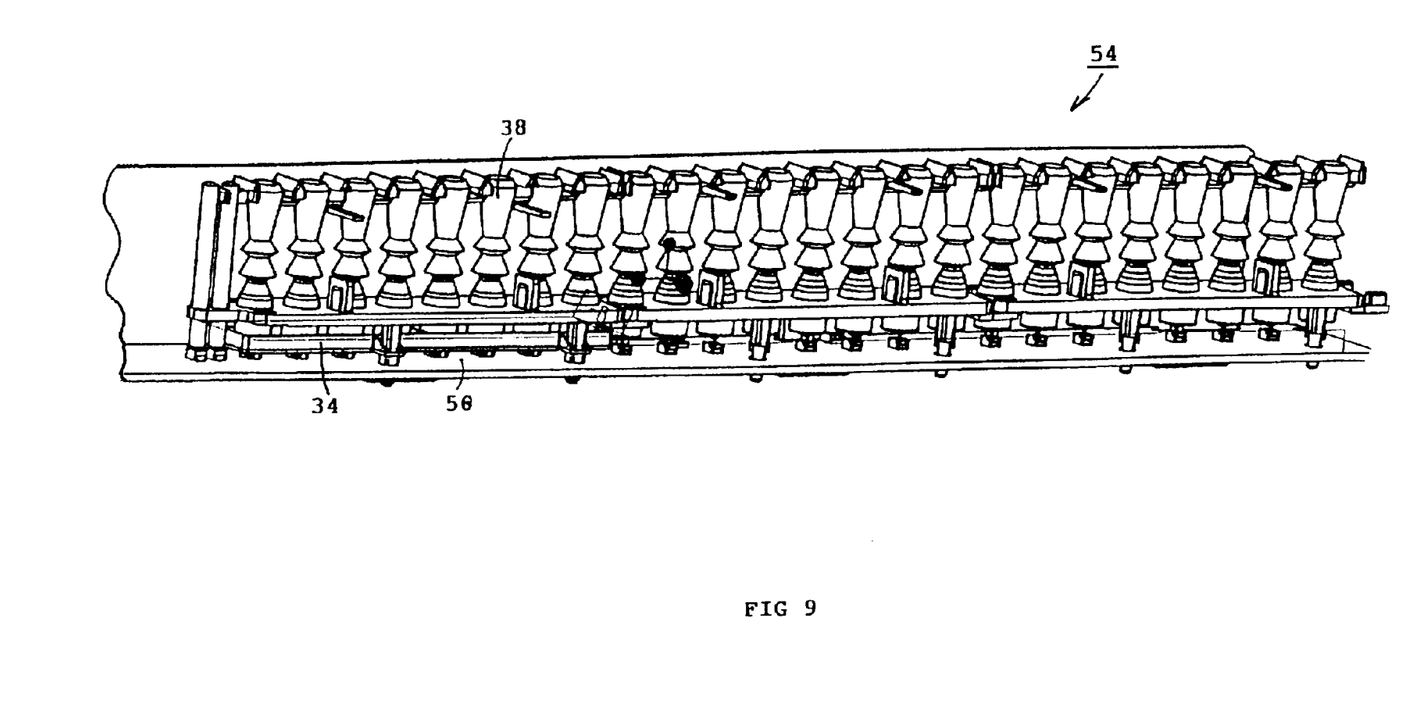
FIG. 9 shows a perspective view of the opto-electronic barrier equipped with a modular assembly of several optical systems according to the invention.

With reference to FIGS. 8 and 9, the optical system 38 is used to achieved safety or monitoring equipment, for example an opto-electronic barrier for protection of workers operating on dangerous machines. The opto-electronic barrier 54 comprises a hollow aluminium sectional part 56 whose length depends on the zone to the monitored. An electronic circuit 58 is inserted in a groove 60 inside the sectional part 56 and comprises a multitude of light-emitting diodes LED or photodiodes depending on whether it is a transmitting ramp or a receiving ramp that is involved. A pierced intermediate plate covers the LEDs or photodiodes and acts as a diaphragm 34. The optical system 38 is then clipped onto the electronic circuit 58 after the fixing parts 42 have been inserted in holes of the board. The second lens 18 of each objective 16 of the optical modules 26 is housed in an opening 62 of the sectional part so as to be able to emit or receive the corresponding light beam 20. The flexible tabs 52 exert pressure on internal bosses 64 of the sectional part 56 to perform mechanical securing of the optical system 38 on the electronic circuit 58. FIG. 9 shows assembly of several optical systems 38 extending longitudinally over a straight section of the opto-electronic barrier 54.

What is claimed is:

1. A light-transmitting optical device, comprising:
a condenser element having a first lens to concentrate light in an opening of an objective, the objective having a second curved lens designed to emit or receive an optical beam, wherein,
the first lens of the condenser element and the second lens of the objective are arranged at a first end and at a second opposite end, respectively of an integrated optical module that is achieved by a straight single-piece entity made of a transparent material having a pre-determined refractive index, and an intermediate zone of said integrated optical module includes a plurality of deflectors formed by a succession of dioptric surfaces which are arranged at intervals along the direction of propagation of the light flux between the first lens and the second lens so as to perform deflection outside the optical module of stray rays reflected inside the optical module, thereby preventing transmission of said stray rays either through the second lens of the objective if a light transmission coming from the condenser element is involved, or through the first lens if receiving light coming from the second lens is involved.

2. The light-transmitting optical device according to claim 1, wherein a diaphragm is associated to the first end of the integrated optical module and includes a calibrated orifice according to an angular opening of a useful optical beam emitted or received by the objective.

3. The light-transmitting optical device according to claim 1, wherein a size of the first lens is chosen according to an angular opening of the optical beam emitted or received by the objective.

4. The light-transmitting optical device according to claim 2, wherein the second lens of the objective presents a preset focal distance whose focus is advantageously identical to a plane of the diaphragm.

5. The light-transmitting optical device according to claim 3, wherein the second lens constituting the objective has a focus that is identical to an opening plane of the first lens.

6. The light-transmitting optical device according to claim 1, wherein the shape and positioning of the dioptric surfaces of the deflectors are chosen to ensure lateral ejection by refraction of the stray rays reflected in the integrated optical module.

7. The light-transmitting optical device according to claim 1, wherein the material of the integrated optical module has a quality of transparency in the 360 nm to 1560 nm pass-band.

8. The light-transmitting optical device according to claim 6, wherein the dioptric surfaces are alternately convergent and divergent and joined to one another by coaxial necks that increases in diameters in the direction of the objective so as to define with a diaphragm a primary optical cone inside the module.

9. A multichannel optical system using an integrated optical module according to claim 1 in each channel.

10. The multichannel optical system according to claim 9, wherein an opto-electronic means is placed in each channel in front of the first lens of the corresponding condenser element and is formed either by an emitting means, in particular a light-emitting diode LED or a laser diode, or by a receiving means, in particular a photodiode.

11. The multichannel optical system according to claim 9, wherein the different optical modules are integrated in parallel manner at regular intervals in a support plate equipped with salient fixing parts for clipping onto an electronic circuit that is housed inside a hollow elongate sectional part.

12. The multichannel optical system according to claim 9, wherein the different modules of an optical system are joined to one another, opposite from a plate, by rigid connecting bridges having flexible tabs to act as pressure means when mechanical securing is performed inside the sectional part, and the second lens of each objective of the optical modules is housed in an opening of the sectional part so as to be able to emit or receive the light beam.

13. The multichannel optical system according to claim 12, wherein the connecting bridges have front faces cut into prisms to deflect the stray beams outside the primary light cone.

\* \* \* \* \*